SIGNAL GENERATOR CONTROL CIRCUIT

Filed Jan. 30, 1959

INVENTOR.
VIRGILIO J. QUIOGUE
BY William E. Cleaver
AGENT

United States Patent Office 2,942,237
Patented June 21, 1960

2,942,237

SIGNAL GENERATOR CONTROL CIRCUIT

Virgilio J. Quiogue, Princeton, N.J., assignor to Burroughs Corporation, Detroit, Mich., a corporation of Michigan Filed Jan. 30, 1959, Ser. No. 790,151
7 Claims. (Cl. 340—149)

Figures 1, 2:
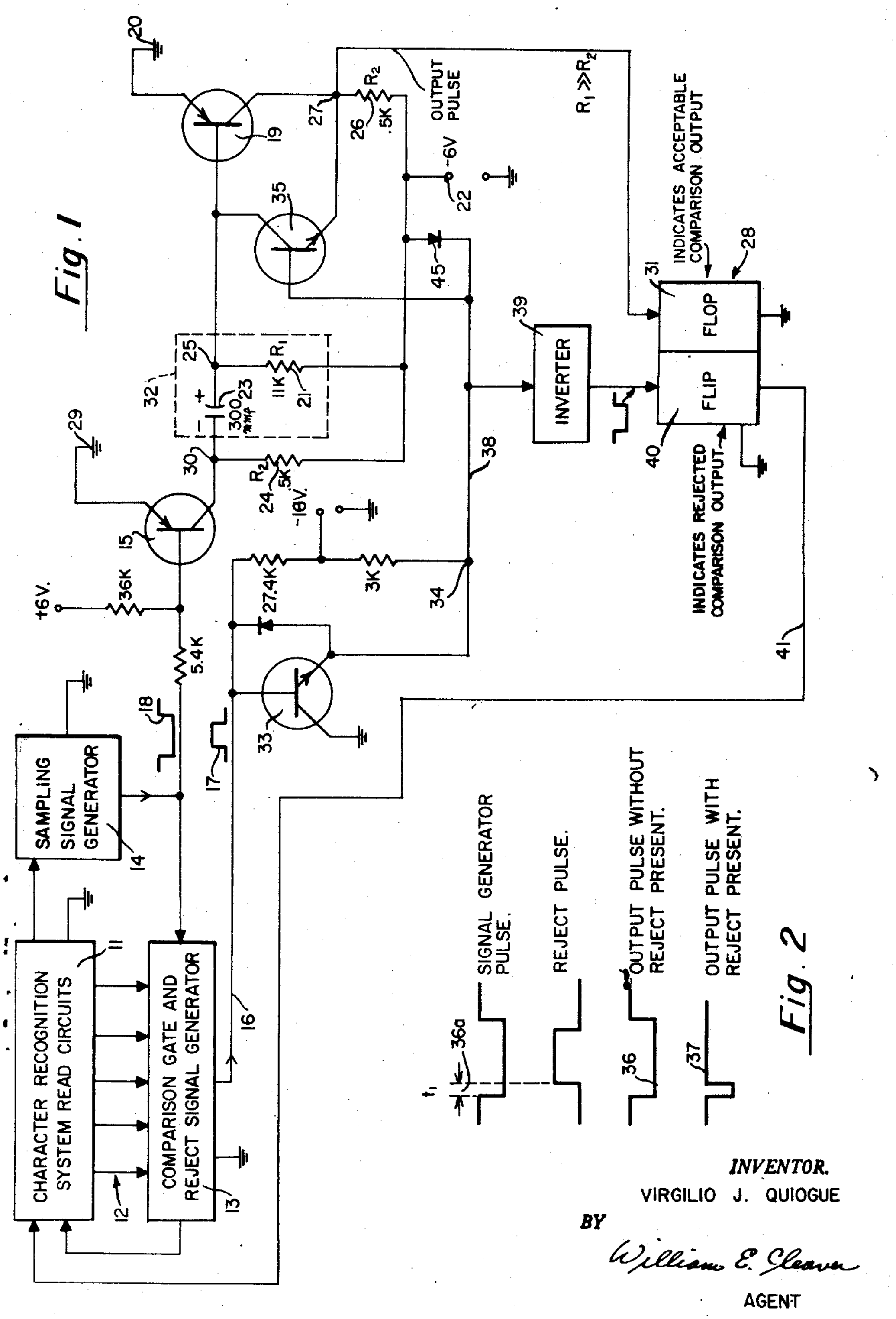

This invention relates to signal generator circuits, and in particular to a signal generator circuit wherein an output signal which is produced in response to an input signal may be terminated early by a reject signal which has been derived from the input signal and which occurs within the enevelope of the said input signal.

The use of gating circuits and of gate signals provided thereby is well known in the electronic switching art. Such circuits provide important basic building blocks upon which the present day data processing systems operate. Often in data processing operations, a particular gate signal is generated to provide an indication that a certain operation has taken place, and the system is made ready to perform the next operation in response to this indicative gate signal. For instance, the popular "AND" gate provides an output which indicates that the input channels to the "AND" gate are all in a certain signal condition, either positive or negative, and that therefore another electronic operative step may take place in response to the "AND" gate output signal.

However, in some data processing operations, although a particular gate signal may be provided to indicate that certain operations have transpired, such gate signals may be considered "conditional" signals. In other words, the data processing system may be required to respond to such gate signals only if some second condition does not take place. For instance, a particular gate signal may indicate that the addition of two numbers has taken place and that now the system is ready for a third number to be added. The requisite answer for the particular machine operation may at the same time dictate that the third number is not to be added if the sum of the first two numbers is a negative sum. This is one illustration of a situation where the indicative gate signal would be a "conditional" signal.

Normally, such a conditional operation is handled in one of two ways. The first way, considering the above illustration, would be to initially examine the sign of the sum, or in the general case, interrogate for a possible limitation which would render the gate signal non-controlling, and if such limitation is present, then the gate signal would be prevented from being generated or transmitted. The second way would be to allow the gate signal to indicate that the machine is ready for the next operation, but if the limiting condition has occurred, to provide an additional operation to generate a second signal which would indicate to the system that the gate signal was an invalid signal and thereafter either prevent the subsequent operation or restore the system to its prior state.

The two described methods for invalidating a particular indicative gate signal each require an inherent consumption of time. This is apparent since a certain amount of time would be consumed to first examine the sign of a sum before deciding whether or not the indicative gate signal should be advanced; and likewise a certain amount of time would be consumed under the second method wherein an additional step is provided to generate a second signal to indicate to the machine that the indicative gate signal should be ignored and/or the information status restored. In high speed operations, such examination or reject time may not be readily available. If there is a possibility of numerous reject occasions, the amount of overall examination and reject time becomes a great time burden on the system. For example, in a character recognition system wherein documents are passing through the system at the rate of four hundred inches per second, and the printed characters thereon are being read, there is very little time available for the system to make a decision as to whether or not there has been a proper reading of the characters, upon which decision the system must either accept or reject the document.

In one form of such character recognition systems, at the sampling or readout time, there is provided a gate signal which indicates to the system that the printed character has been translated into an electrical waveform signal and is ready to be recognized. The system as related to any single read station should recognize only one character at a time, representing respectively the single characters of the document as they appear at the read station.

The system should not indicate a valid recognition of a single character if in point of fact the system has spawned two or more signals which would indicate that the reading station has read two or more characters at the same time. Therefore, if two or more character waveform signals have been provided, it behooves the system, at the time of the sampling signal, to provide a reject signal to indicate to the system that although it is time to recognize the character in the reading sation, there have been two or more signals (at least one spurious) provided and therefore the character on the document at the reading station must be rejected or regarded as a character not recognized. With the provision of such a reject control arrangement, character recognition systems can then provide an opportunity for the operator to examine the document, if it should be desirable.

It is therefore an aboject of the present invention to provide an improved control circuit for a gate signal generator device.

It is a further object of the present invention to provide a control circuit which can terminate an output signal, which is generated in response to an input signal, by a reject signal which is derived from the input signal and which occurs within the envelope of the input signal.

In accordance with a main feature of the present invention there is provided an electron storage device which has a first discharge path and a predetermined discharge time which primarily determines the duration of an output signal. Coupled to the electron storage device is a controllable second discharge path which, when conditioned, instantaneously and initially cuts off the output signal by a voltage shift and simultaneously substantially short circuits the electron storage device, thereby giving rise to a rapid discharge thereof, and consequently continuing the cut off operation of the output signal which otherwise would have had a predetermined time duration.

In accordance with another feature of the present invention there is provided, in conjunction with the above mentioned feature, an electron transfer device which is coupled between the electron storage device and a source of input pulses. This arrangement causes the electron storage device to discharge when said electron transfer device conducts in response to an input pulse being applied. The output pulse which is provided by the discharge of the electron storage device is thereby responsive to an input pulse.

In accordance with another feature of the present invention operating in conjunction with the last two mentioned features, there is provided a source of reject pulses which is coupled to the controllable second discharge path mentioned above, and which, when applied, conditions this controllable second discharge path for conduction during an application of an input signal to the electron transfer device, thereby effecting the termination of the output signal at a time prior to the termination of the input signal, or prior to the predetermined time duration of the normal output signal as described in the first feature.

In accordance with still another feature of the present invention, there is provided a bistable device which is coupled to the output signal and to the reject input signal to provide, if the output signal occurs without any early termination thereof, that the bistable device will be transferred to a state representing a normal output, and on the other hand, if the reject signal occurs so as to terminate the output signal early, that the bistable device will be transferred to a second condition indicating that there has been a reject of the output signal.

The foregoing and other objects and features of this invention will be best understood by reference to the following description of a preferred embodiment of the invention taken in conjunction with the accompanying drawings, wherein:

Fig. 1 is a schematic and block diagram showing the inventive circuit of the present application coupled to a portion of a character recognition system; and Fig. 2 are waveforms to show the time relationship of the signals as they appear in the system.

In the character recognition system with which the present inventive circuit has been primarily employed, each waveform signal derived by scanning a printed character at the reading station is applied to and matched against a plurality of networks, each one of which represents a possible character to be read and each of which provides a maximum signal output, when compared to the output of the other networks, if the waveform signal to which the particular network is assigned is actually being transmitted from the read station. It has been found that sampling a waveform signal over a predetermined time interval which commences just prior to a complete translation of a printed character into an electrical waveform up to and including such complete translation is more reliable than sampling the waveform signal at the instant that there is an apparent complete translation. For a number of reasons such as skew of the printed character relative to the head during document transport, noise generated at the interruption of the circuit at sampling time, phase shift of part of the signal, and irregularities in the character printing, it is sometimes difficult to determine the instant that the printed character has truly been completely translated into an electrical waveform signal. The instant that the correlation network assigned to the character actually being read provides a maximum output signal, when compared with the other networks, should be by definition the time for sampling. If the signal is sampled over an interval, it has been found empirically and statistically that the ultimate maximum signal of a particular correlation network, when compared to the other networks, during the predetermined time interval most truly indicates that actual character being read.

The character recognition system in connection with which the present invention is described, employs a scheme of coarse time sampling the waveform signal over a period of time from just prior to a complete translation up to and including the time of the complete translation. During this coarse sampling time, every maximum output signal generates a fine sampling time pulse which is recognized and remembered until either wiped out by another subsequent and larger amplitude output signal or simultaneously at generation is over-ridden by a reject pulse. If, during this coarse sampling time, two or more output signals are substantially equally large, so that either or any one might be considered maximum if it had appeared alone, a reject signal is generated with such reject signal being derived from the fine sampling time pulse and enveloped thereby.

As suggested above, and as will be explained more fully hereinafter, the inventive circuit of the present application provides that this reject signal, although enveloped by the fine sampling time signal, can render the primary mission of the fine sampling time signal ineffective. Once a reject signal condition is effected, this condition will remain until the next fine sampling time pulse. The initial mission of the fine sampling time pulse is to wipe out any prior reject condition even though almost simultaneously a new reject pulse may be generated to terminate the fine sampling time pulse, again leaving a reject condition. This overlapping insures that each time a fine sampling time pulse occurs, the system is instantaneously restored to a non-reject condition so that if a "no reject condition" is sensed, a valid recognition will be effected in the system.

An over-all consideration of the present inventive circuit, as employed in this last-described character recognition system, reveals that a correlation network maximum output signal occurring within the coarse sampling time pulse, which has not been wiped out by a subsequently larger maximum output, or has not been over-ridden by a reject pulse, will provide a valid recognition status for a particular character in the read station. In response to such a valid recognition there may result an operation which, for instance, might be the placing of the document (after a predetermined transport) into a particular pocket of the sorting machine. On the other hand, if a reject signal is provided and no subsequent maximum output signal wipes out the reject indication, the character will be considered as not properly identified and, in the sorter machine illustration, the document will be placed in the reject pocket.

Referring to Fig. 1, there is shown at 11 a read circuit arrangement for a character recognition system which is symbolic of the type of character recognition system described in a paper entitled "Automatic Input for Business Data Processing Systems," by Eldredge et al., published in the Proceedings of the Eastern Joint Computer Conference, December 1956. In this type of character recognition system, a printed numeral or alphabetic letter passing the reading station is either scanned by photosensitive means, or, having been printed with magnetizable ink, is read by a magnetic head. A dynamic signal having a characteristic waveform which makes the numeral or other character identifiable is produced at the reading station by virtue of these last-mentioned means. The waveform signal produced at the read station in the system is passed along and applied, for comparison purposes, to a plurality of resistor networks which respectively represent the ideal waveform of each of the characters which may be read. An ideal waveform resistor network is provided for each of the possible characters to be read, and the individual network which provides the maximum signal output will be indicative of the particular character which has just passed under the read station.

In Fig. 1, the five channels 12 represent the outputs from five such networks. In actual practice, there will be as many channels as there are networks, and as many networks as there are different characters to be read. Occasionally, in such character recognition systems, more than one network will provide a substantially equally large amplitude signal, each of which, if standing alone, would be a maximum. This condition must be recognized. Since one, and only one, character or symbol should be under the reading head at any one reading time, the system should not indicate electronically that two symbols have been read. Hence, the signals on the five channels 12 are passed to a comparison gate 13. The character recognition read circuit provides a characteristic waveform signal which triggers the sampling signal generator 14 when the dynamic signal produced by the read station is ready to be sampled, or looked at, for purposes of recognition. In the character recognition system described above, generator 14 would provide a coarse and fine timing gate pulse as described above, and in the description to follow the gate pulse 18 is considered to be the fine timing pulse. The sampling signal generator 14 passes a gating signal to the comparison gate and reject signal generator 13, as well as to the transistor 15. At the comparison gate 13, if one, and only one, of the channels 12 has a signal thereon there is no reject pulse provided on the channel 16; however, if more than one of the channels 12 has a signal thereon then there will be a reject signal such as the signal 17 provided on the channel 16.

Considering more directly the role of the present inventive circuit, assume that neither the sampling pulse 18 nor the reject pulse 17 has been applied. Without either of the pulses 17 or 18 being applied, the circuit is in a quiescent state and the transistor 19 is conducting due to the negative bias on its base provided by source 22 by way of resistor 21. There will be base current flow from the ground reference potential at 20 through the emitter-base junction of transistor 19, through the resistor 21 to the source of negative reference potential 22. At the same time the base current will be charging the condensor 23, through the resistor 24, to the negative potential at 22. The condensor 23 will be charged in accordance with the polarities shown thereon, giving rise to an approximate 6 volt difference thereacross when the condensor is fully charged. Point 25 will remain sufficiently negative to keep the transistor 19 conducting, therefore the condensor 23 develops a potential thereacross which is slightly less than 6 volts. Since the approximate 6 volt difference is measured from the −6 volt potential level, the point 25 is slightly negative to ground potential, as explained above. There will also be collector current flowing through the transistor 19 and through the resistor 26 to the source of negative potential 22 in accordance with the above-described transistor action. The flow of collector current will cause the point 27 to rise to about minus 0.1 volt, which is positive relative to its potential when transistor 19 is "off." Since the bistable device, or flip-flop 28, can be switched from one condition to the other only by a negative pulse, the relatively positive potential appearing at the point 27 has no effect on the status of flip-flop 28.

At sampling time, the negative gate pulse 18 is applied to the base of transistor 15 to forward bias the base-emitter junction, turn the transistor "on" and give rise to transistor action thereat. There will be current flow from the ground reference potential 29 through the transistor 15, and through the resistor 24 to the source of negative potential 22. With such current flow taking place, the point 30 will rise and approach ground potential since the voltage drop across the "on" transistor 15 is small. The 6 volt difference of potential which was developed across the condensor 23 will now be measured from ground potential at the left-hand plate, point 30, instead of from −6 volts, thereby rendering the right-hand plate, point 25, at approximately a +6 volts potential above ground. With the point 25 at a positive potential above ground, the transistor 19 is biased "off" and rendered non-conducting, causing the potential of point 27 to fall toward the minus 6 volt value of source 22. As long as the transistor 19 does not conduct, the point 27 will be negative and the flip-flop 28 will be transferred to the "flop" side 31, to either insure a reset of the flip-flop 28 prior to a reject pulse or to indicate that there has been an acceptable comparison unit output.

The transistor 19 will remain in a non-conducting state so long as the point 25 remains relatively positive. The R-C circuit 32, comprising the condensor 23 and the resistor 21, has an R-C time constant which is sufficiently large so that the point 25 will remain above ground potential long enough to provide an output signal at 27 which approximates the input signal 18. This condition is not necessarily inherent in the system and is by design. As condensor 23 discharges, the point 25 will approach the −6 volt level of source 22, but as soon as the point 25 becomes more negative than ground, the transistor 19 will conduct and the point 27 will rise toward ground, thereby terminating the output pulse. It, therefore, follows that the time duration of the output pulse is proportional to, but is not as long as, the R-C time constant of the resistor-capacitor circuit 32 since the output pulse occurs only for the portion of time that the point 25 remains positive with respect to ground. Further examination of the circuit will reveal that the output pulse can be no longer than the length of the input pulse, sampling signal 18, because as soon as the transistor 15 is rendered non-conducting the point 25 will assume a −6 volt potential and the transistor 19 will be turned on.

If, after the sampling signal 18 has been applied to the system at the base of the transistor 15, the reject signal generator at 13 passes a positive reject pulse 17, a somewhat varied operation follows. The circuit operation as described in connection with the application of the pulse 18 will be similar up to a point. In response to pulse 18, transistor 15 is turned "on," point 25 is raised abruptly to +6.0 volts, and transistor 19 is turned "off." However, at time $t_1$, in response to reject pulse 17, as shown in Fig. 2 by the dotted line superimposed over the signal generator pulse, the NPN transistor 33 will be rendered conducting due to the positive pulse applied to its base. With the transistor 33 conducting, the potential of point 34, previously held at −6.0 volts by diode 45 becomes relatively positive, i.e., rises from −6 volts toward ground, thereby rendering the NPN transistor 35 conducting. As soon as transistor 35 conducts, point 27 rises to almost zero or ground potential. It will be recalled from above that when transistor 15 is conducting, the condensor 23 discharges through transistor 15 and resistor 21, and that the R-C time constant was chosen to be long. When the transistor 35 conducts, a discharge path is provided for condensor 23 through transistor 15, transistor 35, resistor 26, to the negative potential source 22. Resistor 21 is chosen to be very much larger than resistor 26, and the low impedance path through the "on" transistor 35 which now shunts resistor 21 causes condensor 23 to discharge very rapidly, thereby causing the point 25 to approach rapidly a potential which is negative relative to ground. As soon as the potential at 25 becomes negative with respect to ground, the transistor 19 is again rendered conducting. The conduction of transistor 19 prevents point 27 from becoming appreciably negative, and thereby continues the flip-flop 28 in the "flip" or reject state into which it was placed by reject pulse 17 as will be described below. The relationship between the output pulse without a reject pulse present, and the output with a reject pulse present, is shown in Fig. 2 by the waveforms 36 and 37.

Returning now to the instant at which the positive reject pulse 17 is applied to the base of the NPN transistor 33 and point 34 moves suddenly in a positive direction, it will be seen that this positive pulse on lead 38 is inverted in inverter 39 and passes as a negative pulse from the inverter 39 to flip-flop 28 causing the bistable device 28 to transfer to the "flip" side 40, which indicates that the comparison device output has been rejected.

It should be further understood that if the reject pulse 17 ends before the input pulse 18 terminates, point 27 will not provide a negative voltage condition which would transfer the bistable devices 28 to the "flop" side 31. This is true because the transistor 19 will not be cut off since the condensor 23, having been discharged through the transistor 35, does not become charged above the ground potential until the transistor 15 is no longer conducting.

It is, therefore, seen that the reject pulse 17 becomes controlling and, even though the input pulse 18 is still being applied, the reject pulse 17 will effect transfer of the flip-flop 28 to the "flip" side 40. Moreover, even though the reject pulse 17 ends before input pulse 18 does, the input pulse 18 is not able to transfer the flip-flop back to the "flop" side 31.

In Fig. 1, coupled to the flip-flop 28, there is shown a lead 41. When the flip-flop 28 is in the "flip" state 40, the reject state, a signal is transmitted over lead 41 to the character recognition system 11, which indicates to the system 11 that the document should be carried to the reject pocket.

The present inventive circuit has been described in operation with a character recognition system, with certain designated potential levels and with certain designated component values for purposes of illustration. It is to be clearly understood that the component values and the designated potential levels could be altered depending upon the design requisites for any particular system without deviating from the spirit and teaching of the present inventive circuit. While I have described my invention in connection with specific apparatus, this description is only by way of example, and not as a limitation to the scope of my invention as set forth in the objects thereof and in the accompanying claims.

What I claim is:

1. In a pulse generator circuit which provides an output signal in response to an input signal, a control circuit to terminate said output signal irrespective of the presence of an application of said input signal, comprising, a source of input pulses, a controllable electron transfer device coupled to said source to be conditioned to conduct in response to a signal therefrom, a first voltage reference source, first circuitry means coupling said controllable electron transfer device to said first voltage reference source, a first electron flow path means coupled to said first voltage reference source, an electron storage device coupled between said electron transfer device and said first electron flow path means, said first electron flow path means in conjunction with said controllable electron transfer device providing a discharge path for said electron storage device, a second voltage reference source coupled to said electron storage device to provide electron storage thereat, output means coupled to said electron storage device to provide an output signal in response to a discharge thereof, said output signal having a predetermined time duration directly proportional to the discharge time of said electron storage device, said electron storage device discharging for said predetermined time along said first electron flow path in response to the conduction of said controllable electron transfer device, a controllable electron flow path means coupled to said electron storage device to be conditioned to provide thereto a second discharge path of high conductivity to discharge said electron storage device in a relatively short period of time when compared to said predetermined time, a source of control signals coupled to said controllable electron flow path means, said controllable electron flow path means conditioned in response to a control signal applied thereto to discharge said electron storage device prior to the end of said predetermined time thereby instantaneously terminating said output pulse irrespective of the presence of said input pulse.

2. In a pulse generator circuit which provides an output signal in response to an input signal, a control circuit according to claim 1 wherein said controllable electron transfer device includes a first transistor device having its base element coupled to said source of input pulses and its collector element coupled to said first reference voltage source and wherein said controllable electron flow path means includes a second transistor device whose base element is coupled to said source of control signals and whose collector element is coupled to said first reference voltage source.

3. In a pulse generator circuit which provides an output signal in response to an input signal, a control circuit according to claim 1 wherein said storage device and said first electron flow path means includes a series coupled resistor-capacitor.

4. In a pulse generator circuit which provides an output signal in response to an input signal, a control circuit according to claim 1 wherein there is further included a bistable device having its first stable state input coupled to said output pulse and its second stable state input coupled to the input to said controllable electron flow path means to indicate when transferred to said first stable state that the output signal is acceptable and when transferred to said second stable state that the output signal is not acceptable.

5. In a pulse generator circuit which provides an output signal in response to an input signal, a control circuit according to claim 1 wherein the control signals are derived from the input pulse and are enveloped thereby.

6. In a pulse generator circuit which provides an output signal in response to an input signal, a control circuit to terminate said output signal irrespective of the presence of an application of said input signal, comprising a source of input signals, a first transistor whose base element is coupled to said source of input signals, a first voltage reference source, first circuitry means coupling the collector element of said first transistor to said first voltage reference source, a series connected resistor-capacitor circuit coupled across said first circuitry means, a second voltage reference source coupled to said capacitor to provide electron storage thereat, output means coupled to said capacitor to provide an output signal in response to a discharge thereof, said output signal having a predetermined time duration directly proportional to the R-C time constant of said resistor-capacitor circuit, said capacitor discharging in response to the conduction of said first transistor device, a second transistor device having its collector element coupled to said capacitor, and its emitter element coupled to said first voltage reference source, a source of control signals coupled to the base element of said second transistor device, said second transistor device rendered conducting in response to a control signal applied thereto to sufficiently discharge said capacitor substantially early with respect to the time duration of said R-C time constant thereby terminating said output pulse irrespective of the presence of an application of said input pulse, and bistable indicating means coupled to said output signal and said second transistor base element to indicate respectively the presence of an acceptable output pulse in one state and a rejected output pulse in the other state thereof.

7. In a character recognition system wherein there is a reading station to translate printed characters into electrical signals and wherein there is provided a sampling signal when a printed character has been sufficiently translated into an electrical signal to provide a recognition thereof and a reject signal when the reading station indicates substantially simultaneously a reading of more than one character, a control circuit to operate in response to said sampling signal and said reject signal to provide respectively an indication of an acceptable or unacceptable character reading, comprising, a controllable electron transfer device coupled to said sampling signal to be conditioned to conduct thereby, a first reference voltage source, first circuitry means coupling said controllable electron transfer device to said first voltage reference source, first electron flow path means coupled to said first voltage reference source, an electron storage device coupled between said electron transfer device and said first electron flow path means, said first electron flow path means in conjunction with said controllable electron transfer device providing a discharge path for said electron storage device, a second voltage reference source coupled to said electron storage device to provide electron storage thereat, output signal means coupled to said electron storage device to provide an output signal in response to a discharge thereof, said output signal having a predetermined time duration directly proportional to the discharge time of said electron storage device, said electron storage device discharging for said predetermined time along said first electron flow path in response to the conduction of said controllable electron transfer device, a controllable electron flow path means coupled to said electron storage device to be conditioned to provide thereto a second electron flow path of high conductivity to discharge said electron storage circuitry in a relatively short period of time when compared to said predetermined time, said controllable electron flow path coupled to said reject signal to be conditioned in response thereto to discharge said electron storage device prior to the end of said predetermined time thereby instantaneously terminating said output signal, and a bistable device having its first state input coupled to said output signal and its second state input coupled to said reject signal to indicate in said first state an acceptable character reading and in said second state an unacceptable character reading.

No references cited